May 2, 1933. B. C. PLACE 1,906,884
SECURING GARNISH MOLDINGS
Filed Aug. 6, 1931
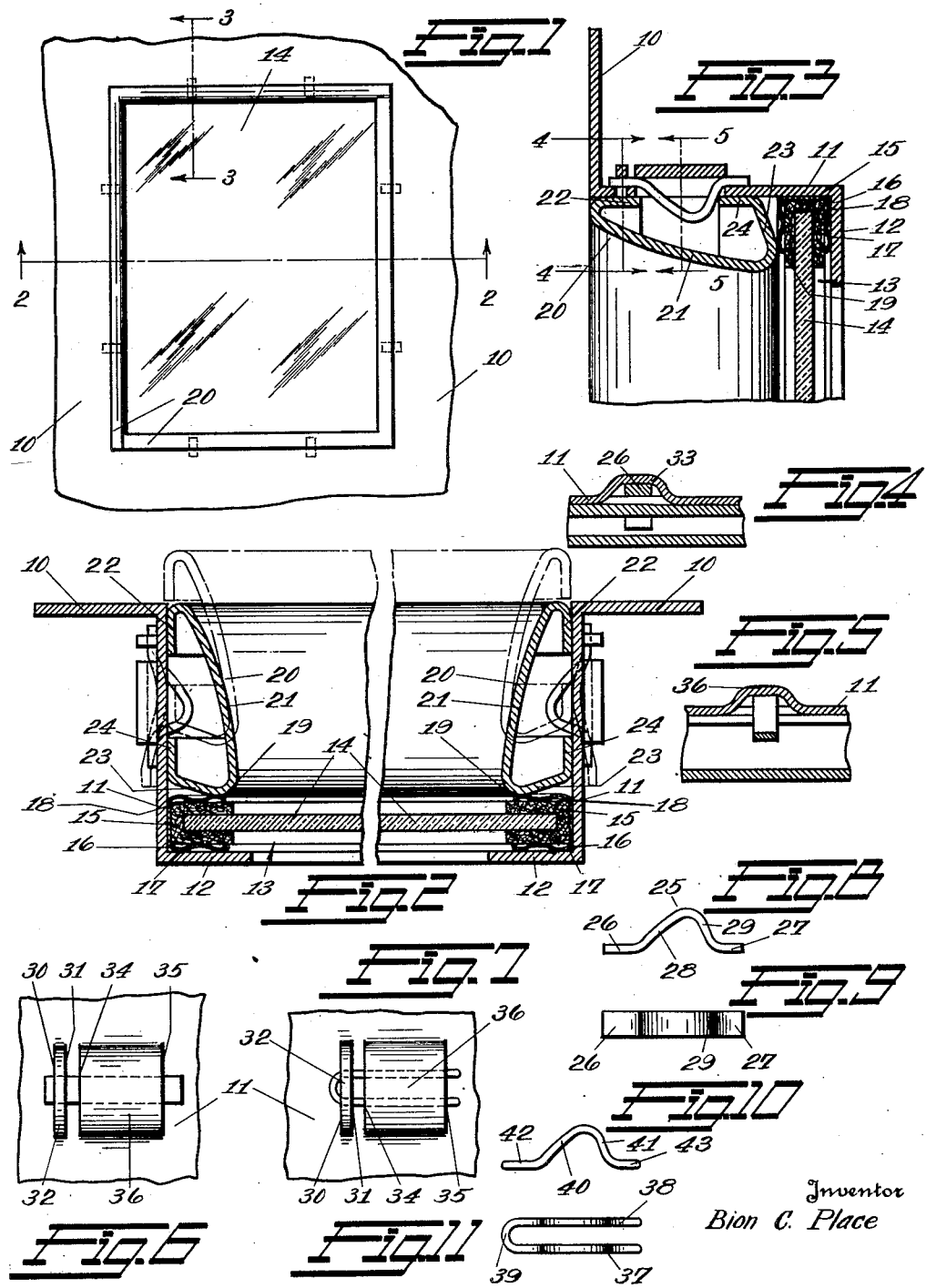
Inventor
Bion C. Place Patented May 2, 1933

1,906,884

UNITED STATES PATENT OFFICE

BION C. PLACE, OF DETROIT, MICHIGAN, ASSIGNOR OF ONE-HALF TO GEORGE E. GAGNIER, OF DETROIT, MICHIGAN

SECURING GARNISH MOLDINGS

Application filed August 6, 1931. Serial No. 555,631.

This invention relates to a method of and arrangement for securing garnish moldings or the like in an opening in a frame in which the molding fits. More particularly, the invention relates to a method of and arrangement for securing garnish moldings, that are constructed in the form of a closed figure, in an opening in a frame by means of spring fasteners that automatically assume their operative position after the garnish molding is moved into said opening.

In the construction of automobile bodies, for example, it is customary to apply moldings to finish the interiors of all window openings. Such moldings are generally constructed in the form of an open figure, such as a rectangle, corresponding to the opening in the frame to which the molding is to be secured. Generally, such moldings are constructed by electrically welding straight molding sections together to form an integral structure, which structure is subsequently applied to the opening in the frame in which the window is positioned, the molding serving, after it is applied in operative position, to maintain the window in place, and for the further purpose of garnishing the frame surrounding the window.

In the construction in the automobile body, difficulties have been encountered in securing moldings of this type in position at the factory. Heretofore, such moldings have generally been secured in position in the frame by means of screws. In order to retain the screws it is customary to put small nuts in back of the frame into which the screws are subsequently inserted. Such nuts are supported by pockets each made of a separate piece of sheet metal formed into a roughly rectangular boxlike shape, which is secured to the metal of the frame beneath a fastener opening therein so that the nut is loosely held beneath said opening in a position to receive the screw subsequently applied. The subsequent application of the screw into one of the nuts is laborious and time-consuming because, inasmuch as the nut is loose or floating, to a limited extent, it becomes very difficult to find the opening in the nut with the tip of the screw. Moreover, it frequently happens that the screw driver of the operator will slip off of the screw and scratch the surface of the molding making it necessary to scrap the molding and send it back for refinishing.

This invention aims to provide a method and arrangement for securing moldings of the kind described within an opening in the frame into which the molding fits, so as to make it unnecessary to use separate fasteners of any kind, and which method and arrangement will enable the mechanic, in applying the molding, to bring it into proper position by simply inserting the molding into the frame, and in which this simple operation constitutes the sole act on the part of the operator in completing the assembly of the garnish molding into the opening in the frame.

Another object of the invention is to provide an arrangement for securing moldings, that are made in the form of a closed figure, in an opening into which they have been inserted, in which spring fasteners are utilized to maintain the molding in position, completely concealing said fasteners.

Still another object of the invention is to secure a molding in position in an opening in a frame by means of resilient fasteners that are mounted so as to yield to enable the molding to be moved into its operative position, which fasteners then automatically spring into their operative position, engaging the molding and retaining it in position without necessitating further fastening means of any kind.

A still further object of the invention is to provide fastening arrangements for moldings or the like which are so designed that the fastening means presents a cam surface in the path of movement of the molding as it is moved into its operative position, so that the engagement of the molding with said surface serves to retract the fastening means and which fastening means includes at the same time a relatively sharp shoulder arranged to snap into position, holding the molding in place after it has passed over said surface.

Another object of this invention is to provide a means to hold garnish moldings in place in an opening in which they fit, which means is so designed that it exerts a continuously effective pressure tending to yieldingly press said molding toward a closure that may be held in position thereby.

Still further objects of the invention will appear as a description thereof proceeds with reference to the accompanying drawing, in which Figure 1 is a fragmentary elevational view showing a garnish molding held in place within a window opening in the frame of an automobile.

Figure 2 is a transverse sectional view taken in the plane indicated by the line 2—2 in Figure 1, looking in the direction of the arrow, this figure being drawn on an enlarged scale to more clearly illustrate the details of the construction.

Figure 3 is a fragmentary vertical sectional view, taken on the plane indicated by the line 3—3 of Figure 1, looking in the direction of the arrows.

Figures 4 and 5 are cross sectional views taken respectively on the plane indicated by the lines 4—4 and 5—5 of Figure 3.

Figure 6 is a fragmentary view of a portion of the frame and one of the spring fasteners as it appears when looking directly toward the fastener.

Figure 7 is a view similar to Figure 6, showing a modified form of spring fastener.

Figures 8 and 9 are respectively side elevational and plan views of the sheet metal type of fastener included in Figures 1 to 6 of the drawing.

Figures 10 and 11 are respectively side elevational and plan views of the modified form of fastener constructed of wire and illustrated in assembled relation in Figure 7.

Like reference characters indicate like parts throughout the several figures.

The present invention is particularly intended for use in securing the garnish moldings in place in the window frames of automobile bodies without regard to whether the window frames form a part of the body proper, or of the doors that are utilized to close the openings in said bodies. Steel moldings, finished in imitation of wood, are at present preferred in the art to garnish the window frames and to retain the enclosure for the window openings in place. Inasmuch as the frame to which the molding is applied is inaccessible from the rear for the application of nuts or the like, it has been customary to apply the nuts to retain screws, used to hold the molding in place, by fixedly securing to the frame a box-like housing loosely receiving each nut, the casings for the nuts being applied so that the openings in the nuts are opposite openings in the frame through which the screw is intended to pass. The nuts utilized for this purpose are loosely disposed within the casing, so that they are capable of slight lateral movement in order that they can be brought into correct position with respect to the subsequently applied screws, the precise position of which may not be in exact registry with the opening in the nut. The subsequent application of the screws into the nuts in the molding is laborious and time-consuming and correspondingly costly.

By the present invention, it is proposed to utilize spring fasteners to retain the moldings in position, thus avoiding the use of extraneous fasteners of any kind. Preferably, the spring fasteners are attached to the frame in position to automatically grip the molding and interlock it with respect to the frame after the molding has been moved into position, though it should be understood that the fasteners may be secured to the molding and formed so as to engage cooperating holding shoulders on the frame when the molding is properly positioned therein.

Referring to the drawing, 10 designates a portion of the body of an automobile, which is provided with a portion 11 defining an opening for a window. The portion 11 is turned outwardly, providing a flange 12 that completely surrounds the opening in the frame and constitutes a stop for a window 13. The window 13 may include a pane of g ass 14, the edges of which are surrounded by felt channels 15 disposed within a thin metallic channel 16, the sides 17 and 18 of which are curved and spaced from the port so as to provide resilient side walls. The edges of the sides are curved inwardly at 19 to bear against the felt. The channel 16 is provided so as to present compressible side walls engaging the felt. Any other construction of window may be used, the window construction constituting, per se, no part of the present invention.

A garnish molding 20, constructed preferably of sheet steel, is provided to retain the window 13 in the opening in the frame. Said mo ding may be constructed in any desired cross-sectional form, but, preferably, it consists of a body portion 21 which may assume any ornamental configuration, or it may be curved as illustrated in the drawing. One edge of the blank from which the molding is formed is turned inwardly, as indicated at 22, while the other edge is bent toward the frame to provide a bearing portion 23 presenting a rounded portion to the channel 18. Beyond the bearing portion, the edge of the blank from which the molding is constructed is turned toward the flange 22, as indicated at 24, providing bearing portions in precise alignment with the flange 22, the latter providing the bearing for the portion of the molding most remote from the window. Preferably, the molding is made in sections that are welded or otherwise secured together at the corners so as to provide a molding in the form of a closed figure, fitting precisely between the portions 11 of the frame. As illustrated such a molding is of hollow form with the flanges 22 and 24 substantially separated providing ample space within which spring fasteners presently to be described may protrude into the hollow molding.

In order to interlock the molding with respect to the frame, the frame is provided with a plurality of spring fasteners, which fasteners may assume the form illustrated in Figures 8 and 9, or the form illustrated in Figures 10 and 11. In Figures 8 and 9, the preferred fastener consists of an elongated resilient sheet metal member 25, including straight end portions 26 and 27 connected by the cam portion 28 and holding portion 29. The portion 28 is curved gradually so that it provides a camlike surface, which, when it is engaged as by moving the molding into position in the opening, will gradually cause the spring fastener to be bent with respect to the end 26. The portion 29 is shaped to provide a relatively sharp shoulder to hold the molding in position, said shoulder being inclined so that the spring fastener serves to exert a constantly effecting wedging action tending to yieldingly hold the molding within the frame. The end 27 of the fastener constitutes a stop which will prevent the projecting portions 28 and 29 from, inadvertently or otherwise, becoming bent or distorted, when the fastener is secured in the frame and thus preventing the functioning of the fastener in the manner intended.

The end 26 of the spring fastener is secured to the interior surface of the portion 11 of the frame in any convenient manner, the fastener being arranged as illustrated in the drawing, so that the length thereof is disposed in a direction normal to the plane of the window. Preferably, in order to facilitate the attachment of said end of the fastener, the frame 11 is slitted as indicated at 30 and 31 providing a band 32 which is bent out of the plane of the portion 11 as illustrated at 33 in Figure 4. The end 26 is disposed between the band 33 and the under portion of the inside surface of the portion 11, and welded or otherwise fixedly secured, said end being thus firmly held in position. The end 26 may be attached to the portion 11 of the frame in any other appropriate manner.

Portion 11 of the frame inwardly of the slits 30 and 31 is provided with further parallel slits 34 and 35, (Figure 6) and the metal thus separated from the body of portion 11 is then bent out of the plane of this portion as indicated at 36 (Figure 5). The fastener 25 is assembled with respect to the portion 11 of the frame by inserting the end 26 through the opening provided by bending the metal 36 out of the plane of said portion and disposing it between the band 33 and fixedly securing it in place. The portions 28 and 29 project through the opening in the frame provided by bending the portion 36 out of the plane thereof, as illustrated; the stop portion 27 of the fastener being disposed in back of the portion of the frame beyond the slit 35. By this arrangement, each fastener is held in position at one end and the body thereof is free to flex with respect to said end. The portions 28 and 29 normally project substantially beyond the surface of the frame member 11 against which the garnish molding is intended to abut.

The fasteners are assembled with respect to the frame, preferably two fasteners being provided for each side of a window opening of ordinary size as illustrated in Figure 1. The frame being equipped with fasteners in this manner, permits the molding to be assembled by simply inserting it in the frame. Inasmuch as the molding is made in the form of an open figure that simply fits within the frame, it is only necessary that a fastening means be provided that will prevent reverse movement of the molding out of the frame and fasteners arranged as just described, accomplish this result.

In assembling the molding with respect to the frame, it is slid in the frame toward the window, that is held in position thereby. When the molding, in its movement toward said window, engages portions 28 of the fasteners, said fasteners are caused to flex by virtue of the fact that the forward corner of the molding rides over the cam surface provided by said portions, causing the retraction of the fasteners in the recesses of the frame provided by bending the portions 36 of said frame as above described. The portion 36 also constitutes a stop, limiting the inward movement of the fastener. At this point of the movement of the molding toward its operative position, the fasteners and molding assume the position illustrated in dotted lines in Figure 2 of the drawing. As the movement of the molding toward its operative position continues, flange 24 rides off the portion 29 of the fastener, which, by virtue of its inherent resilience tending to force it into its normal position, causes the portion 29 to engage the corner of the flange 24, presenting a relatively abrupt shoulder holding the molding firmly in place in the frame. Inasmuch as the portion 29 is, preferably, inclined as illustrated, it will be understood that said portions of the various fasteners holding the molding in position exert a wedging action applying a continuously effective yielding pressure, pressing the molding toward the window. The arrangement described, it will be observed, avoids the use of extraneous fasteners of any kind and enables the assembly of the moldings with respect to the frames within which they fit, to be brought about in the simplest possible manner. At the same time the spring fasteners which function automatically are completely concealed by the molding, and no condition may arise which would result in a marring of the molding when applying it in place.

If desired, in place of the spring fastener illustrated in Figures 8 and 9, that shown in Figures 10 and 11 may be used. As illustrated in these figures, the fastener comprises a single piece of resilient wire including a pair of arms 37 and 38 connected by a U-bend 39. Each of the arms 37 and 38 is curved to provide a portion 40 corresponding in function and mode of operation to the portion 28 previously described, and a portion 41 corresponding to the portion 29 of the previously described fastener. In addition, the modified fastener includes an attaching portion 42 and a stop portion 43 corresponding respectively to the portions 26 and 27 of the fastener previously described. This fastener is assembled with respect to the portion 11 of the frame, as illustrated, in precisely the same way as the sheet metal fastener is assembled with respect thereto. The preferred mode of assembly is illustrated in Figure 7 of the drawing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination, an open frame, a closure in said frame, a garnish molding fitting in said open frame and holding said closure therein, and resilient fastening means in the form of separate springs mounted in said frame to yield when said molding is moved toward the closure and concealed by said molding, said means holding the molding from movement away from said closure.

2. In combination, an open frame, a closure in said frame, a garnish molding fitting in said open frame and holding said closure therein, and resilient fastening means carried by said frame in the form of separate springs presenting holding shoulders designed to co-operate with shoulders on said molding whereby said molding is retained by said means when said molding has been moved to its operative position adjacent said closure.

3. In combination, an open frame, a closure in said frame, a hollow garnish molding fitting in said open frame and holding said closure therein, and separate laterally flexible spring fasteners in the form of elongated curved members secured at one end to said frame and having relatively abrupt shoulders designed to engage a portion of the hollow molding, said members being mounted so as to yield inwardly of the frame when said molding is moved to its operative position retaining said closure in said frame.

4. In combination, a frame, a molding formed to provide a shoulder, and a separate elongated laterally flexible spring fastener presenting an inclined abrupt shoulder to said first named shoulder, said spring fastener including means to permit the withdrawal of said fastener and its shoulder within said frame so that said molding may be assembled in said frame without interference of said fastener.

5. In combination, a frame, a molding formed to provide a shoulder, and a separate elongated laterally flexible spring fastener presenting an abrupt shoulder to said first named shoulder, said spring fastener being attached at one end to said frame and being curved so as to provide a cam disposed so as to cause said molding to withdraw said fastener within said frame when the molding is assembled with respect thereto and to provide an inclined relatively abrupt shoulder to hold the molding in the frame.

6. In combination, a frame, a hollow molding presenting a concealed shoulder, and a spring fastener holding said molding in place, said fastener being in the form of an elongated spring disposed so that its length is normal to the molding, said spring being formed to provide an abrupt shoulder co-operating with said concealed shoulder and including means to cause said abrupt shoulder to be moved out of its operative position when said molding is moved along the length of said spring.

7. The combination defined in claim 6 in which said spring fastener is attached to said frame at the end remote from said molding by means including a band struck from said frame.

8. The combination defined in claim 6 in which said spring fastener consists of a piece of wire bent between its ends to provide two arms connected by a U-bend.

9. The combination defined in claim 6 in which said spring fastener is attached to said frame at the end thereof remote from said molding and is maintained free of attachment adjacent its opposite end, said last named end having a portion that serves as a stop by engagement with said frame when the fastener is in its operative position.

10. A spring fastener consisting of an elongated blank of resilient metal having in succession from one end toward the other along the length thereof, an attaching portion, a curved portion shaped to provide a cam to flex the fastener with respect to said attaching portion, a relatively abrupt inclined holding shoulder, and a stop portion.

11. The fastener defined in claim 10 in which said blank consists of a single piece of wire formed of two relatively long parallel arms connected by a U-bend.

12. In combination, a frame provided with an opening, a molding in the form of a closed figure fitting in said opening, and spring fasteners presenting inclined holding shoulders arranged at intervals around said molding holding the latter yieldingly in position.

13. In combination, a frame provided with an opening, a closure for said opening, a molding in the form of a closed figure fitting in said opening, and spring fasteners holding the molding within said opening, said fasteners presenting relatively abrupt inclined shoulders to said closure, said inclined shoulders exerting a yielding pressure on said molding causing it to bear firmly against said closure.

14. In combination, a frame provided with an opening, a closure for said opening, a hollow molding in the form of a closed figure fitting in said opening presenting a shoulder on the portion thereof adjacent said frame, and a plurality of separate elongated springs secured to said frame with their length normal to said molding and protruding in said opening, each of said springs having a cam surface designed to engage said molding and be retracted upon entry thereof in said opening and an inclined relatively abrupt shoulder to engage said molding shoulder when said molding contacts with said frame.

In testimony whereof I affix my signature.

BION C. PLACE.